United States Patent [19]
Munson et al.

[11] Patent Number: 6,084,872
[45] Date of Patent: Jul. 4, 2000

[54] TRUNK AND SWITCH ARCHITECTURE FOR PROVIDING SWITCHED-CIRCUIT CONNECTIONS TO ON-LINE DATA SERVICES

[75] Inventors: Robert Leonard Munson, Elk Grove Village; Melissa Maes-Wolfson, Buffalo Grove; Donna Marie Steadman, Orland Park; Efrain Cortez, Naperville, all of Ill.

[73] Assignee: Ameritech Corporation, Hoffman Estates, Ill.

[21] Appl. No.: 08/961,313

[22] Filed: Oct. 30, 1997

[51] Int. Cl.[7] .................................................. H04L 12/28
[52] U.S. Cl. ..................... 370/351; 370/410; 370/522; 379/229
[58] Field of Search .................. 370/351, 352, 370/353, 354, 355, 356, 357, 360, 522, 410; 379/229, 230

[56] References Cited

U.S. PATENT DOCUMENTS

| | | | |
|---|---|---|---|
| 5,313,463 | 5/1994 | Gore et al. | 370/110.1 |
| 5,375,124 | 12/1994 | D'Ambrogio et al. | 370/110.1 |
| 5,423,003 | 6/1995 | Berteau | 395/200 |
| 5,442,691 | 8/1995 | Price et al. | 379/220 |
| 5,610,910 | 3/1997 | Focsaneanu et al. | 370/351 |
| 5,680,446 | 10/1997 | Fleischer, III et al. | 379/114 |
| 5,712,903 | 1/1998 | Bartholomew et al. | 379/89 |
| 5,812,639 | 9/1998 | Bartholomew et al. | 379/89 |

*Primary Examiner*—Chau Nguyen
*Assistant Examiner*—Forood Boortalary
*Attorney, Agent, or Firm*—McDonnell Boehnen Hulbert & Berghoff

[57] ABSTRACT

A method and system for providing a network which routes telephone calls to the dial-up access line of on-line data services, such as an Internet Service Provider. The calls are routed over, over data trunks to a circuit-switch that consolidates access to on-line data services. The data trunks are separate from trunks carrying normal voice telephone calls. At the originating office where the telephone call originates, the call is recognized as a call to a telephone number associated with the dial-up access telephone number of an on-line data service. A database selects a route over a data trunk to the terminating office having a circuit-switch that consolidates access to the on-line data services. The consolidation of access to on-line data services over segregated data trunks to a single circuit-switch reduces congestion in the network by relieving the network from handling a large volume of long duration telephone calls.

24 Claims, 4 Drawing Sheets

TRUNK AND SWITCH ARCHITECTURE FOR PROVIDING SWITCHED-CIRCUIT CONNECTIONS TO ON-LINE DATA SERVICES

BACKGROUND OF THE INVENTION

A. Field of the Invention The present invention relates to a method and device for directing circuit-switched connections carrying on-line data to an on-line service such as the Internet. More particularly, the present invention relates to a device and method for switching telephone calls to the dial-up access lines of Internet Service Providers.

B. Description of the Related Art

In the past, most telephone service subscribers have used telephone service for placing ordinary voice calls. Plain old telephone service ("POTS") is typically delivered over a subscriber loop between the subscriber's home or office and the local telephone company central office. The telephone company central offices provide a circuit-switched network to establish connections between subscribers wishing to communicate. In such a circuit-switched system, a circuit connection is established and maintained for the duration of each telephone call.

Recently, the popularity of on-line computer data services such as the Internet has changed the way subscribers use their telephone service. Rather than placing voice telephone calls, subscribers now use their telephones to access on-line computer data services such as the Internet. In contrast to voice telephone calls, which are relatively short in duration, the average telephone call carrying computer data to the Internet is many times longer. These longer hold time telephone calls tie up the telephone company's switching equipment which was designed for shorter duration telephone voice calls. The public switched telephone network ("PSTN") and associated circuit-switching equipment was designed to be shared by only a fraction of subscribers actually using the telephone at any time. PSTN includes those public switched telephone networks provided by AT&T, Regional Bell Operating Companies (e.g., Ameritech, U.S. West, Bell Atlantic, Southern Bell Communications, Bell South, NYNEX, and Pacific Telesis Group) and others. The PSTN was designed with the assumption that only about 12% of residential users and 20% of business users will be on the telephone at any given time. Now, many more households are using the telephone for longer durations than the system had ever been designed to handle.

In addition to longer duration telephone calls, the increasing number of telephone calls to access on-line data services has increased the volume of call traffic in the PSTN. In particular, the trunk facilities into the central offices which contain telephone numbers providing telephone dial-up access to Internet Service Providers ("ISP") have seen a dramatic increase in call traffic, which is expected to continue to grow. These terminating offices providing access to ISPs have seen the most growth in call traffic and thus the greatest potential for call congestion. Because of the load on the network, customers may experience longer waits for dial tone, longer connection times, and even the blocking of telephone calls. If not addressed, call congestion in these offices may result in a degradation of the quality of telephone service to all customers. ISPs are expected to request high-capacity trunk connections to the PSTN at these offices at an increasing rate.

To address the increasing call duration and traffic, network equipment suppliers have proposed segregating telephone calls to ISPs to be carried on separate data networks. For example, telephone calls to telephone numbers providing access to ISPs may be routed to a packet-switched data network that efficiently carries high-speed digital data traffic. A packet-switched network establishes a virtual circuit connection that, rather than maintaining a connection for the duration of the telephone call, uses transmission resources only when data is actually transmitted. Such a virtual connection is well suited for users of computer services who are connected for long periods of time but only spend a relatively small proportion of time actually transmitting and receiving data. Packet networks, however, have not yet been as widely deployed and would require substantial new investments in network equipment. Packet data solutions also require new network elements, new operational processes, resources, and the ISP adoption of network based modem solutions to allow subscribers access to the packet data network.

In the interim, telephone companies have adjusted the configuration of their existing PSTN circuit-switched network. For example, telephone companies have rebalanced their central offices to evenly distribute the load of high usage subscribers throughout the equipment. Additionally, trunking and switching equipment throughout the entire network has been expanded to handle the increased call traffic. Increasing the capacity of the entire network, however, is costly and does not necessarily generate additional revenue to cover the cost of the additional equipment. Moreover, introducing increasing switching and trunking capacity throughout the entire network is disruptive, and difficult to administer and manage.

In accordance with an illustrative embodiment of the present invention, the problems of handling an increased volume of telephone calls to on-line data services can be reduced.

BRIEF DESCRIPTION OF THE DRAWINGS

The foregoing and other objects, features and advantages of the present invention will be more readily appreciated upon reference to the following disclosure when considered in conjunction with the accompanying drawings, in which.

DETAILED DESCRIPTION OF THE PREFERRED EMBODIMENT

The present embodiment uses existing network equipment to relieve call congestion on the PSTN by consolidating telephone calls to computer data services on dedicated trunks and switching equipment. Calls to telephone numbers accessing on-line computer data services, such as an Internet Service Provider ("ISP"), are identified at the originating central office and routed to an interoffice trunk facility for transmission to a terminating central office having a circuit-switch providing access to on-line data services. The interoffice trunk facility is dedicated for telephone calls carrying data to ISPs. Preferably, the circuit-switch or ISP switch at the terminating central office provides consolidated access to the different computer data services within the Local Access and Transport Area ("LATA").

In the described embodiment, a circuit-switching network for routing telephone calls carrying data traffic to an on-line data services from an originating central office to a terminating central office is addressed. A database is in communication with the originating office to identify telephone calls carrying data traffic to on-line data services. Telephone calls identified by the database are routed to an interoffice data trunk between the originating central office and the terminating central office. The interoffice data trunk is dedicated for telephone calls carrying data to on-line data services. Dial-up access to on-line data services is not handled from the switching equipment that normally provides voice telephony access. Rather, dial-up access to on-line data services is consolidated by a circuit-switch at the terminating central office. Telephone calls to on-line data services are thus routed over separate trunk lines to a switch that is separate from those handling voice telephone calls. Also described are exemplary embodiments of a database with a routing table and service logic to determine trunk routes to the terminating central offices over the interoffice data trunks.

The dedicated circuit-switched data facility provides a solution to network congestion caused by telephone calls to ISPs in the interim period before packet-based data networks and other more efficient forms of transmitting digital data can be widely deployed. By consolidating telephone calls accessing on-line data services over dedicated trunking and switching equipment, the remaining network handling voice telephone calls is relieved of a large volume of data traffic calls that consume transmission equipment resources for a long duration of time. Thus, call volume and congestion is reduced throughout the voice network, resulting in faster dial tone service, faster connection times, and a reduction in the probability of blocked calls.

In addition, the expansion of network equipment capacity necessary to handle the increasing volume of telephone calls carrying computer data is necessary only in the dedicated circuit-switched facility, without having to increase capacity throughout the rest of the switching network. The cost of increasing network trunking and switching capacity to handle computer data calls is limited to the dedicated data facility and reduced accordingly. Administration and management of the expansion of the network is also simplified.

Figure 1:
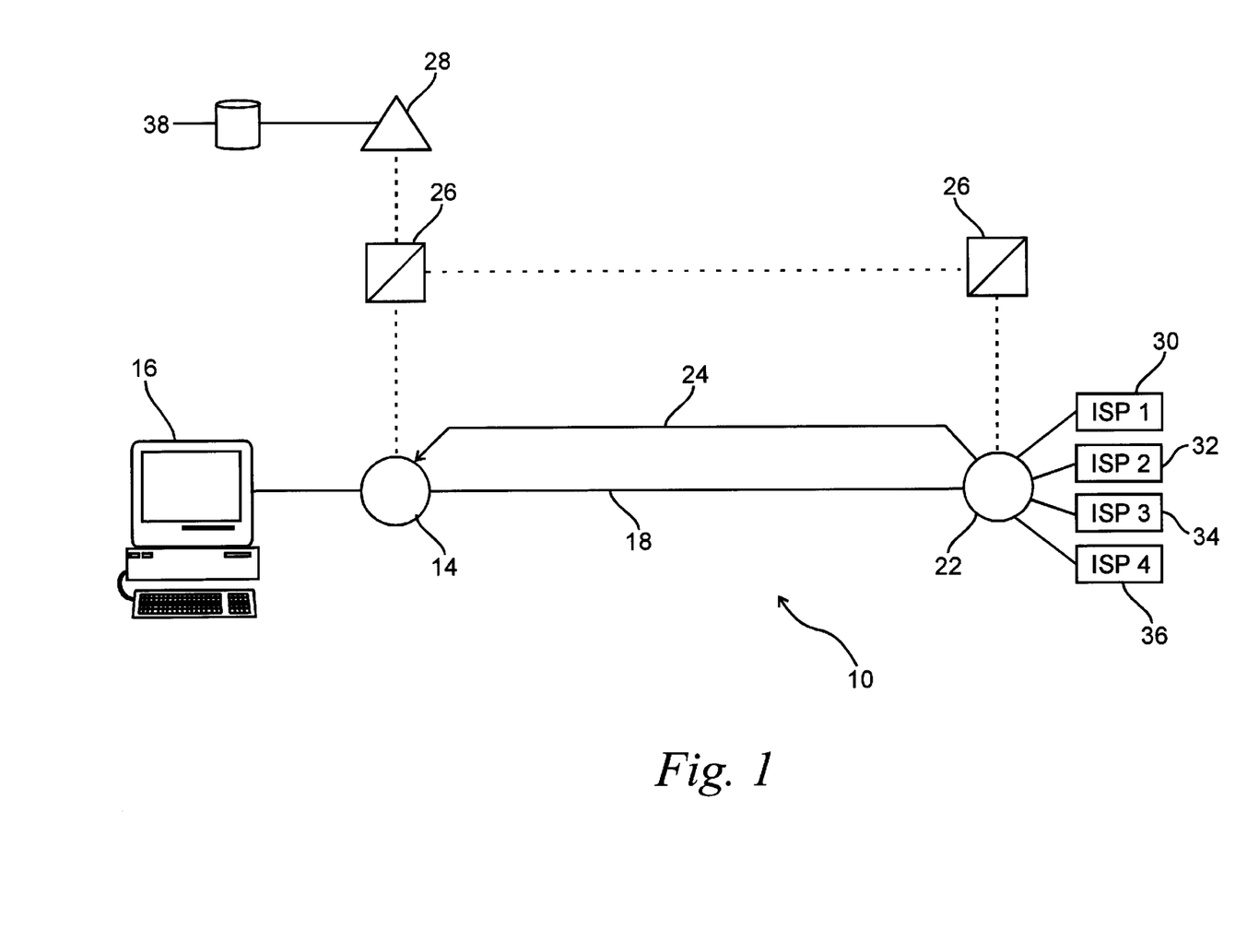
FIG. 1 is an overall system diagram of the circuit-switching network in accordance with the present invention.

FIG. 1 shows a block diagram of the present embodiment of a circuit-switched network 10 having dedicated equipment facilities for circuit-switching telephone calls to on-line data services. The circuit-switch network 10 includes a plurality of conventional local end offices or originating offices 14 which provide convention plain old telephone service ("POTS) to a plurality of subscribers 16. For illustration purposes, only one of the plurality of subscribers and originating offices are shown. The originating offices 14 may be implemented with Lucent 5 ESS, 4 ESS, Nortel DMS-100, and Siemens EWSD switches. The originating offices may also provide higher capacity digital access service to the subscribers 16 such as Integrated Digital Services Networks ("ISDN"), Digital Subscriber Lines ("DSL"), Asymmetric Digital Subscriber Lines ("ADSL"), T1 lines, etc. Preferably, the originating offices 14 have advanced intelligent network ("AIN") capability and may be referred to as a Service Switching Point ("SSP"), as described further below.

Typically, the originating offices 14 are directly interconnected with trunk lines 18. Trunk lines 18 carry telephone calls between originating offices. It should be understood that originating offices may also be connected with trunk lines accessing a tandem switch, as well known to those skilled in the art. Tandem switches provide trunk circuits between originating offices that are not directly connected by trunk circuits.

In the present embodiment, the computer services, shown as ISPs 30, 32, 34, 36, within a defined local service area are accessed from a single terminating office containing a circuit-switch hub 22. Typically, the local service area is referred to as a Local Access and Transport Area or LATA. In this present embodiment, access to the ISPs 30, 32, 34, 36 within the LATA is consolidated through the circuit-switch hub or ISP switch 22. For example, all requests from ISPs for facilities to implement dial-up access lines from within a LATA are to be provisioned from the ISP switch 22. Due to local capacity considerations or the logistics of reconfiguring existing ISP connections that are serviced from other switching equipment, however, a number of ISPs may also be serviced by other switching equipment in accordance with the present invention. The ISP switch 22 may include a conventional circuit-switch such as a #5 ESS from Lucent Technologies, a Nortel DMS-100, or Siemens EWSD switch as described for the originating offices 14. Preferably, the ISP switch 22 provides access to the ISPs 30, 32, 34, 36 using 1 Measured Business lines ("1 MB"), T1/DS1, or Primary Rate Interface ("PRI") trunks.

Interoffice data trunks 24 provide connections between the originating office 14 and the terminating office ISP switch 22. It should also be understood, that in addition to providing data trunks and ISP access, the ISP switch 22 may also have separate voice trunks 18 to provide conventional POTS and provide the functions of an originating office 14. Preferably, data trunks 24 are dedicated to routing calls carrying computer data, and segregated from data trunks 18 carrying voice telephone calls. The data trunks 24 are digital high-speed trunks carrying voice band computer data traffic at a DS1 rate or higher to the ISPs 30, 32, 34, 36 that are serviced by the ISP switch 22. Preferably, data trunks 24 are provisioned to perform normal digit prefixing and deletion.

The circuit-switched network 10 uses a network common channel signaling protocol to control the initiation, routing, and termination of telephone calls. Preferably, the network operation is controlled by an advanced intelligent network ("AIN") signaling system such as Signaling System 7 ("SS7"), known and widely used throughout the PSTN in North America. Telephone services and functions may be provided using AIN for centralized control of the network operation. In the present embodiment, AIN identifies telephone calls that are destined for ISPs 30, 32, 34, 36 and routes these calls over the data trunks 24 to the ISP switch 22. For example, the originating office 14 uses AIN triggers and queries to identify that the called telephone number is a telephone dial-up access line to an ISP. AIN then selects a route to connect the call to the ISP switch 22 over the data trunks 24. The AIN operation of the present embodiment is described in more detailed below.

In the preferred embodiment, the originating offices 14, also referred to as a SSP in an AIN capable system, communicate with AIN Signal Transfer Points ("STP") 26 and Signal Control Points ("SCP") 28 to implement the AIN signaling protocol messages. The SSP 14 is a programmable switch programmed with AIN triggers to recognize AIN calls and launch queries to a SCP, and receive responses in the form of data and commands from the SCP to process and route calls. For example, all telephone calls to numbers associated with dial-up access to an on-line data service are programmed with an AIN trigger. In response to an AIN trigger, the originating offices 14 communicate with a SCP 28 to determine how the calls are to be handled. The signaling is communicated through out-of-band signaling, or common channel signaling, over a separate signaling network utilizing STPs 26. STP 26 routes messages from originating offices to the SCP 28. Preferably, the STP 26 uses a Global Title Translations to route queries from the originating offices 14 to the SCP 28.

The SCP 28 preferably includes a microprocessor controlled computer system using computer peripherals controlled by application software implementing SS7 AIN functionality. SCP 28 typically includes a database 38 containing information about the network 10 and its subscribers 16. For example, the SCP database 38 maintains trunk routing information for routing calls to the ISP switch 22. The SCP 28 responds to queries from the originating offices to determine the routing of telephone calls based on information in its database 38 and information provided by the originating office 14. STPs and SCPs are available from a number of telephone switch vendors such as Lucent Technologies, Nortel, and Siemens.

Figure 2:
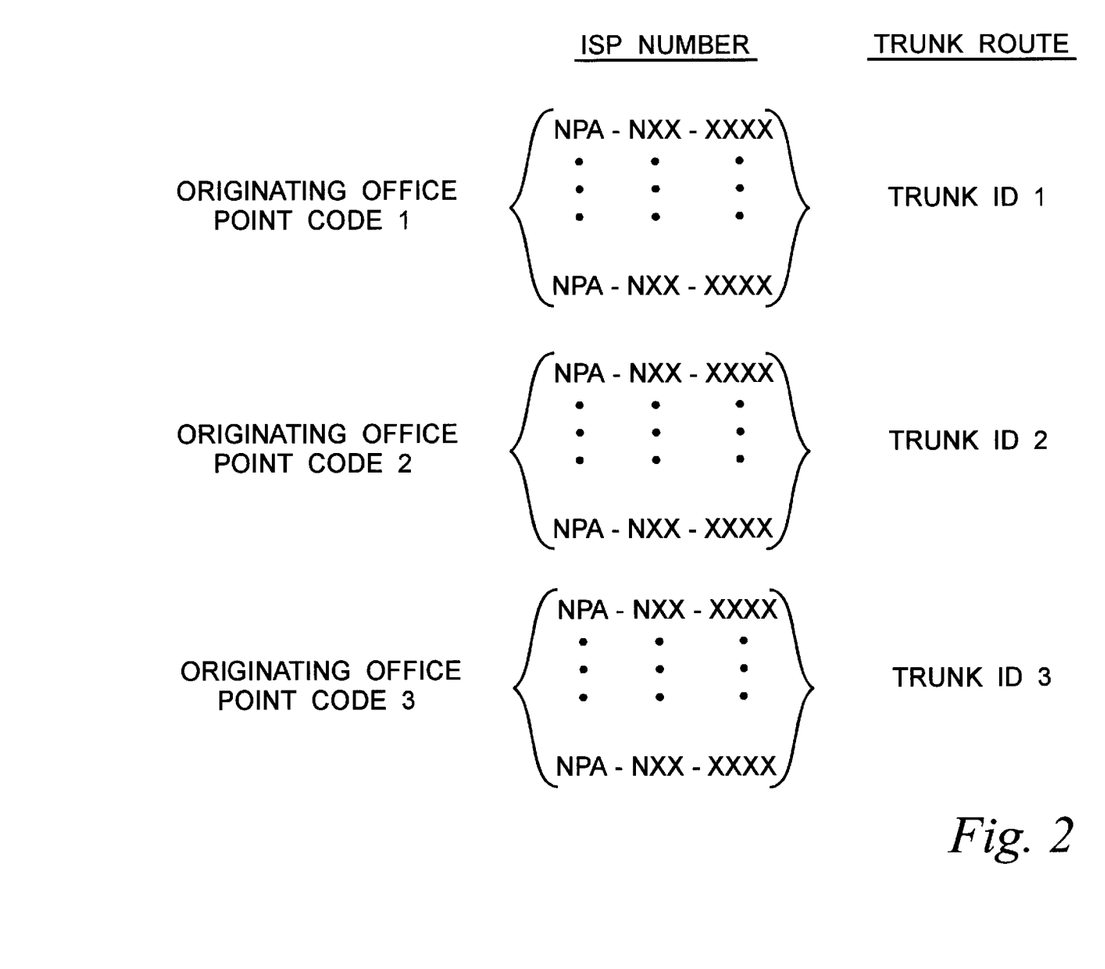
FIG. 2 shows a routing table in accordance with an aspect of the present invention of the system of FIG. 1.

In the present embodiment, the SCP database 38 stores telephone numbers that are used to allow dial-up access to an ISP which can be cross-referenced with the originating office 14 point codes to derive a trunk route index. The trunk route index identifies a data trunk 24 to the ISP switch 22. The SCP database 38 may store the ISP telephone numbers and originating office point codes in a memory storage device such as a random access memory, a magnetic or optical disk drive. It will be recognized by those skilled in the art that a combination of different memory storage devices or other types of memory devices may also be used. The database 38 preferably stores the network information in a data record such as an array, lookup or pointer table, or other suitable data structure. For example, the ISP telephone numbers are stored in the database as 10 digit telephone numbers having the (NPA) NXX-XXXX format used in North America. The NPA is the Number Plan Area, or the area code, NXX is the Central Office Code, and XXXX is the customer line. The SCP database table also stores point codes uniquely identifying originating offices to be cross-referenced with the ISP telephone numbers to derive a route index. FIG. 2, shows a representative example of a database routing table correlating an originating office point code and an ISP telephone number to a trunk route identification number. Preferably, the table supports up to 200 originating offices and 200 ten-digit ISP access numbers. The SCP database 38 preferably contains a routing table for each LATA.

The SCP database 38 may also maintain a number of other parameters to control the routing operation of ISP calls. For example, the SCP database 38 may include a LATA routing disabling parameter that disables the routing of calls to ISPs over the dedicated data trunks throughout the LATA. Using this parameter, the routing of ISP calls can be rapidly disabled on a LATA-wide basis. Calls accessing on-line data services are then switched as ordinary voice telephone calls. Similarly, parameters indicating whether the routing of ISP calls is enabled for a point code of an originating office or the ISP access number should also be available for quickly disabling the ISP routing on an originating office or switch basis. In addition, a parameter can also identify the proper coding for the PrimaryTrunkGroup parameter based on the switch code. The parameter should define the length, justification and fill for the PrimaryTrunkGroup.

Figure 3:
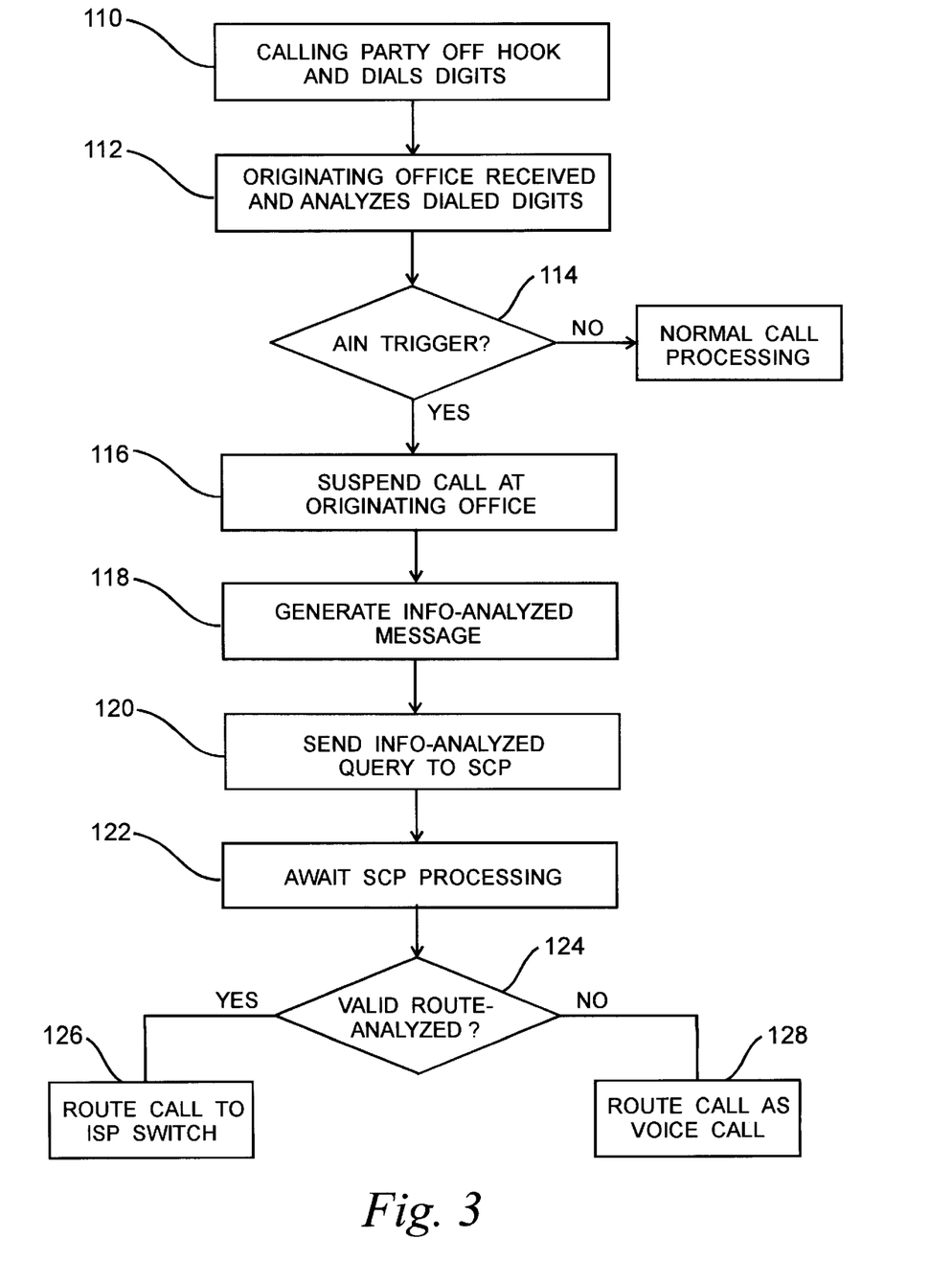
FIG. 3 is a high-level flow chart showing the call processing of the system of FIG. 1.

Now referring to FIG. 3, the call routing operation of the network is described. The call routing operation is described in connection with Advanced Intelligent Network 0.1 Switching Systems Generic Requirements (TR-NWT-001284) and the Advanced Intelligent Network 0.1 Switch-Service Control Point Application Protocol Interface Generic Requirements (TR-NWT-001286), which are fully incorporated by reference. Described below are the components necessary to implement the embodiment in accordance with the principles of the present invention.

In the present embodiment, the dialing of an ISP telephone number causes the originating office 14 to query the SCP 26 (FIG. 1) for information about the dialed telephone number as follows. First, the calling party goes off-hook and sends the dialed digits to the originating central office at step 110. The originating central office collects and analyzes the dialed digits 112 to determine whether AIN processing is required at step 114. The originating office has AIN triggers set for each ISP telephone number (e.g. a 3/6/10D type trigger or Termination Attempt Trigger in 5 ESS and DMS switches). In the present embodiment, every originating office has a 10 digit Specific Digit String ("SDS") trigger provisioned for each ISP access number. When the originating office 14 receives the digits of an ISP access number, the SDS trigger associated with the ISP dial-up access telephone number will be triggered at step 114. The processing of the call will be suspended at that point 116. The trigger causes the originating office to generate an Info__Analyzed message and sends it to the SCP 118. The triggers should be translated to ensure the Info__Analyzed message has the required AIN parameters to be transmitted to the SCP. For example, a 10 digit SDS trigger is required in the present embodiment. The Info__Analyzed message should also have a SCP Calling Party address field containing the point code of the originating switch. The Info__Analyzed message also preferably includes the following parameters:

Called Party ID—identifies the called ISP, or if 0+ dialing is used

PrimaryCarrier—determines if the call is 2-PIC or carrier routed

ChargePartyStationType—determines if call requires an operator rating

In response to the SDS trigger, the originating office sends the Info__Analyzed message with the appropriate parameters to the STP which routes the query to the SCP at step 120. The originating office awaits either an Analyze__Route or Continue message response from the SCP at step 122. The SCP 28 (FIG. 1) receives the Info__Analyzed message and queries its database for information associated with the called number to determine how the telephone call should be routed. The SCP database 38 maintains information relating to whether the called telephone number is a dial-up access connection to a computer service such as an ISP. If the telephone number is assigned to a dial-up connection of an ISP 30, 32, 34, 36, the call is to be routed over the data trunk 24 to the ISP switch 22. The SCP 28 identifies the originating office 14 sending the trigger based on the point code of the originating switch. The terminating office of the called ISP can be determined based on the dialed telephone number.

In the present embodiment, the SCP 28 uses a service logic routine to determine an interoffice trunk route for the call to the terminating office 22. The service logic routine uses the originating switch point code and destination ISP from the SCP database 38 to determine a data trunk 24 from the originating switch 14 to the ISP switch 22. The trunk routes are determined by cross-referencing the originating office with the dialed telephone number. For example, a routing table, such as shown in FIG. 2, maps the originating office point code 14 with the ISP telephone number associated with a switch terminating office 22 to determine the trunk index of the data trunk 24 from the originating office 14 to the terminating office 22. The operation of the service logic routing will be described in more detail in connection with FIG. 4. It should be understood that many different methods may be used to determine the call routing as will be appreciated by those skilled in the art.

If the SCP database 38 service logic is successful in determining a route to the ISP switch 22, it returns the AIN Analyze_Route message. The Analyze_Route message contains the PrimaryTrunkGroup parameter identifying the trunk index or route index to which the call should be routed. If the service logic is not able to determine a route index based on the parameters within the received Info_Analyzed message, it will respond with a Continue message that has no parameters. The Continue message causes the call to be handled as an ordinary voice telephone call. The service logic may be unable to determine a route index for several reasons. For example, a required parameter, CalledPartyID, ChargPartyStationType, or PrimaryCarrier, may not have been present in the Info_Analyzed message received by the SCP. If all the data trunks to the ISP switch are busy, a Continue message can also be sent so that the call will overflow to normal voice trunks based on the dialed digits. In addition, several conditions may dictate that the call be handled over the voice network rather than the data trunks, such as calls originated from coin telephones or those the caller requests be carried by other carriers.

The Analyze_Route or Continue message is sent back to the originating office toh determine if a valid Analyze_Route message specifying the data trunk was received at step 124 (FIG. 3). If a valid Analyze_Route was received, the originating office routes the call based on the trunk group identification at step 126. A circuit-switched connection to carry computer data is established between the originating office and the terminating office over the dedicated data trunks identified by the Analyzed_Route message. If a valid Analyze_Route message was not received, the call is routed as an ordinary vice telephone call at step 128.

Figure 4:
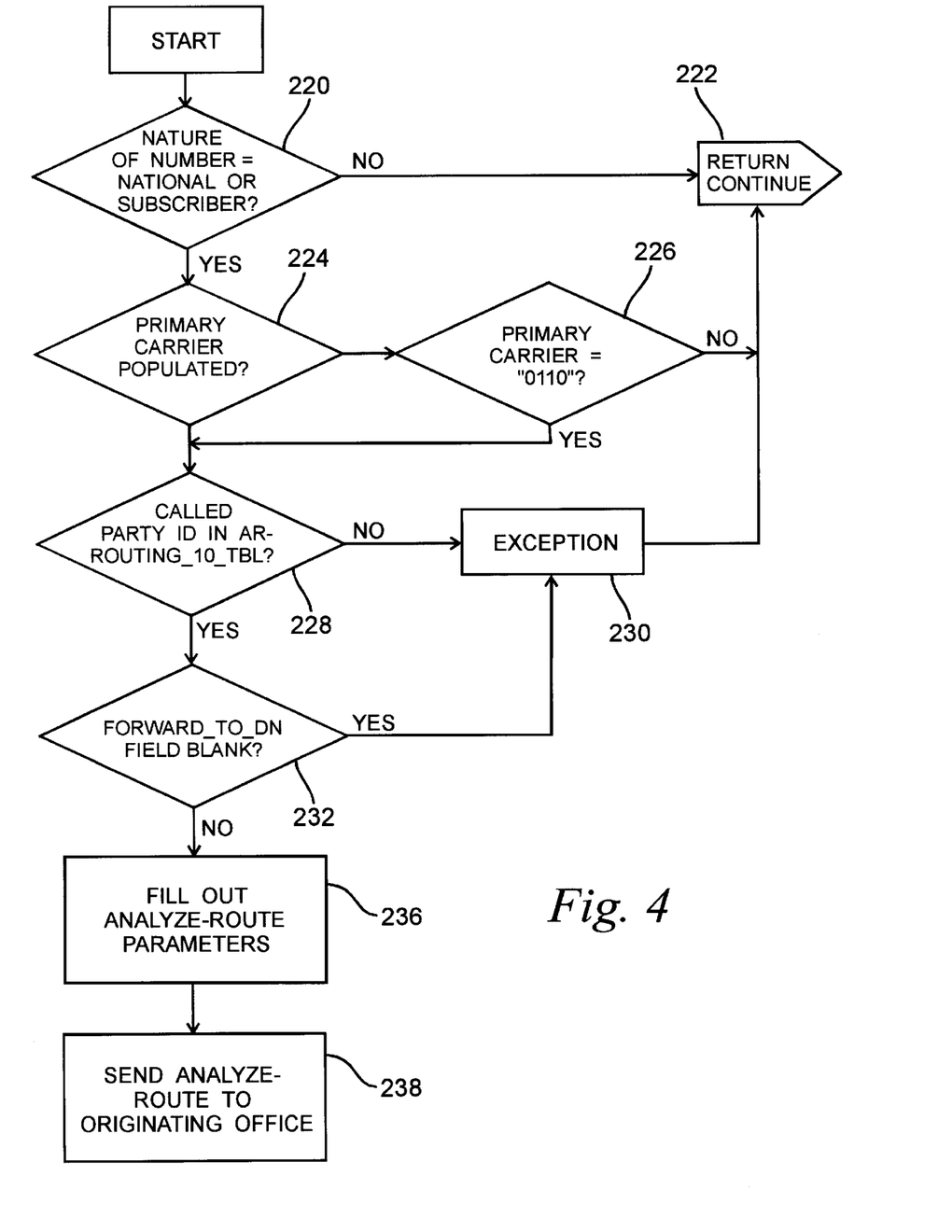
FIG. 4 shows a high-level flow chart of the service logic of the system of FIG. 1.

Referring now to FIG. 4, illustrated is a high-level flow chart depicting the SCP database service logic of the present embodiment. At step 220, the dialed telephone number is analyzed to determine whether the called telephone number is a national or subscriber number. If the called number is not a national or subscriber number, e.g., an international telephone number, the service logic returns a Continue 222 and the call is processed as a normal voice call. At step 224, if the call is to a national or subscriber telephone number, the primary carrier field is checked to see if it is populated with a primary carrier identification. If the call is destined for another network or carrier, such as when the caller dials 0+ or another carrier's access code, it should be routed as a normal voice call at step 222. It should be noted that if PIC or 2-PIC applies, or the call was originated from a coin pay telephone, then the call should also be routed as a normal voice telephone call at step 222. In this example, if there is a primary carrier identification that is not equal to "0110" at step 226, the service logic returns a Continue at step 222 and the call is processed as a normal voice call. If the primary carrier field is not populated or populated with "0110", the service logic proceeds to search for the CalledPartyID in AR_ROUTING_10_tbl at step 228.

The AR_ROUTING_10_tbl contains the 10 digit telephone number of the ISP dial-up access. Preferably the AR_ROUTING_10_tbl contains a Forward_TO_DN field with the 10 digit telephone number of the ISP. If the CalledPartyID is not found in the AR_ROUTING_10_tbl, an exception occurs at step 230 and Continue 222 is returned to route the call as a normal voice call. As with the conventional handling of regular telephone voice calls, an exception is an alarm generated in response to errors that can occur at any point in the call processing. In the present embodiment, the exception causes the call to be handled as a normal voice call.

If the CalledPartyID is found in the AR_ROUTING_10_tbl, the Forward_TO_DN field is checked at step 232. If the Forward_TO_DN filed is blank, and exception occurs at step 230 and Continue is returned to process the call as a normal voice call at step 222. If the Forward_TO_DN field is populated with a number, the Analyze_Route fields are filled out at step 236. The fields processed at step 236 include setting the CalledPartyID_Digits to the AR_Routing_10_tbl field Forward_TO_DN. The nature of the number will be set to "acdnon_national_number" and the Numbering Plan will be set to "anp_isdn_numbering_plan." The nature of the number field is used, for example, to identify operator assisted calls (0+) which should be routed to the operator system and not the data trunks. The various fields are summarized below.

ChargeNumber—The automatic number identification of the calling party passed from the Info_Analyzed message to the Analyze_Route.

CallingPartyID—Contains the directory number of the calling party passed from the Info_Analyzed message to the Analyze_Route.

ChargPartyStationType—The calling station type passed from the Info_Analyzed message to the Analyzed_Route message.

CalledPartyID—Contains the directory number of the called party from the AR_Routing_10_tbl field "Forward_TO_DN" based on the CalledPartyID.digits, plus the following fields:
CalledPartyID_Digits=AR_Routing_10_tbl.Forward_TO_DN
CalledPartyID_NONs=acdnon_national_number
CalledPartyID_Num_Plan=anp_isdn_number_plan After these fields in the Analyze_Route message are completed, the SCP returns the Analyze_Route message to the originating office at step 238.

In the preferred embodiment, the trunk routes are identified by the Analyze_Route message by returning a new directory number which causes the originating office to send the call over the data trunks to the ISP switch. ISPs assigned to the ISP switch are assigned telephone numbers within a particular NPA. The ISPs, however, can maintain their existing telephone numbers and can be reached by subscribers at their existing telephone numbers. The SCP service logic performs the translation from the old number to the actual telephone number in the ISP NPA. For example, the subscriber dials the existing telephone number of the ISP and the SCP service logic. The SCP, upon recognizing that the called telephone number is associated with an ISP dial-up number, returns the Analyze_Route message with the actual ISP dial-up telephone number in the NPA assigned to ISPs. According to the dialed telephone number, the Analyze_Route message gets the new ISP number within the ISP NPA from the AR_Routing_10_tbl Forward_TO_DN_field. The Analyzed_Route message returned to the originating office therefore has the new ISP number which causes the originating office to route the call over the data trunks to the ISP switch.

While the present embodiment has been described as a method, it should be understood that the method may be embodied in a system and device according to the principles of the above embodiment. A variety of software, firmware, and hardware can be used to implement the embodiments described herein. For example, the described service logic may be implemented in a high-level C or C++ programming language by those of skill in the art. The software may be compiled, stored, and executed in either firmware or a disk-based operating system. SCPs are available from the various switch manufacturers, Lucent Technologies, Nortel and Seimens.

The present embodiment has many advantages over the existing method of handling telephone calls carrying computer data. New ISP PRI and DS1 trunk requirements will be consolidated and provisioned from the ISP switch without effecting other central offices. Installation and administration of ISP network requirements of a single switch are thus simplified and improved. The cost of increasing the capacity of the entire network to handle calls to on-line data services is reduced because only the capacity of the data trunks and ISP switch need be increased. The ISP switch and data trunks can be engineered for handling data calls without the considerations imposed by voice traffic. Likewise, the existing voice network can be engineered without the considerations imposed by data calls. The number of long duration computer data calls are reduced from the network improving reliability and reducing congestion on the existing voice network.

The SCP is also capable of maintaining statistics on call traffic to ISPs to more accurately track and forecast equipment requirements. For example, the SCP can record on an hourly basis:

Number of calls to each ISP number
Number of ISP calls from each IRS switch
Number of ISP calls not provisioned in SCP by switch
Number of ISP calls not provisioned in SCP by directory number
Number of ISP calls not routed because of carrier routing
Number of ISP calls not routed because of coin origination It is to be understood that both the foregoing general description and the following detailed description are exemplary and explanatory and are intended to provide further explanation of the invention as claimed. Numerous modifications and variations are possible. For example, the steps of the flow diagrams may be taken in sequences other than those described and the invention may be practiced with more or fewer elements than those shown. It is intended that the foregoing detailed description be regarded as illustrative rather than limiting. It is the following claims, including all equivalents, which are intended to define the scope of this invention.

We claim:

1. A circuit-switching network for routing circuit-switched connections carrying data traffic to on-line data services from an originating central office to a terminating central office comprising:
    a database in communication with the originating central office to provide information identifying circuit-switched connections carrying data traffic to on-line data services;
    a plurality of interoffice data trunks between the originating central office and the terminating central office that carry circuit-switched connections to on-line data services; and
    a circuit-switch at the terminating central office for providing access to on-line data services from the originating central office, wherein for circuit-switched connections carrying data traffic to on-line data services, the database identifies interoffice data trunks dedicated exclusively for carrying data traffic to the circuit-switch providing access to the on-line data services.

2. The system of claim 1 wherein the database provides information identifying circuit-switched connections carrying data traffic in response to an advanced intelligent network query.

3. The system of claim 1 wherein the database further comprises a routing table for identifying interoffice data trunks between the originating central office and the terminating central office.

4. The system of claim 3 wherein the routing table comprises telephone numbers associated with dial-up access lines to on-line data services.

5. The system of claim 1 wherein the circuit-switch consolidates trunk access to on-line data services from throughout a LATA.

6. The system of claim 5 wherein the circuit-switch trunk access to the on-line data service comprises a primary rate interface.

7. The system of claim 5 wherein the circuit-switch trunk access to the on-line data service comprises a T1/DS1 line.

8. The system of claim 1 wherein the interoffice data trunk comprises a T1 trunk line.

9. The system of claim 1 wherein the interoffice data trunk carries only calls to on-line data services.

10. The system of claim 1 wherein the circuit-switch for providing access to the on-line data services is a circuit-switch that is not in the normal terminating office for the voice telephone numbers to the on-line data service.

11. A method of routing circuit-switched connections carrying data traffic from an originating central office to a terminating central office with a circuit-switch providing access to on-line data services to relieve congestion caused by circuit-switched connections carrying data to on-line data services comprising the steps of:
    identifying at the originating central office circuit-switched connections for accessing the on-line data services;
    identifying an interoffice data trunk route to establish the circuit-switched connections for accessing on-line data services, wherein the interoffice data trunk is dedicated to carrying only data calls to on-line data services;
    establishing a circuit-switched connection for the calls identified for accessing on-line data services over the interoffice data trunk dedicated to carrying only data calls to on-line services to the terminating central office circuit-switch providing access to on-line data services.

12. The method of claim 11 wherein the circuit-switched connection is a telephone call.

13. The method of claim 11 wherein the step of identifying a circuit-switched connection is performed by identifying whether a dialed telephone number is associated with a dial-up access line to a data service.

14. The method of claim 11 wherein the step of identifying a circuit-switched connection is an advanced intelligent network function.

15. The method of claim 11 wherein the step of identifying an interoffice data trunk route comprises accessing a database comprising a plurality of telephone numbers proving dial-up access to a data service and a plurality of point codes identifying originating offices.

16. The method of claim 15 further comprising the step of:
    determining from the database the interoffice data trunk route carrying circuit-switched connections to the terminating central office for connection to the on-line data service in accordance with the plurality of telephone numbers proving dial-up access and the plurality of point codes identifying originating central offices.

17. The method of claim 16 wherein the determining step indexes the telephone number proving dial-up access and the point codes identifying originating offices in a routing table to determine the interoffice data trunk route.

18. A database for routing circuit-switched connections carrying data traffic to on-line data services from an originating central office to a terminating central office consolidating access to on-line data services, the database comprising:

a routing table comprising a plurality of telephone numbers associated with dial-up access lines to on-line data services, a plurality of originating central offices, and a plurality of trunk routes to the terminating central office consolidating access to on-line data services; and service logic to determine a selected trunk route in accordance with the routing table, wherein the service logic indexes the telephone number with the originating central office to determine the selected trunk route dedicated to carrying only data traffic.

19. The database of claim 18 wherein the routing table identifies the plurality of originating central offices by a point code.

20. The database of claim 18 wherein the routing table identifies the plurality of trunk routes by a trunk index.

21. The database of claim 18 wherein the routing table identifies the telephone numbers associated with dial-up access lines to on-line data services by a ten-digit NPA-NXX-XXXX.

22. The database of claim 18 wherein the service logic determines the trunk route by identifying a trunk index.

23. The database of claim 18 wherein the service logic determines the trunk route by identifying a ten-digit NPA-NXX-XXXX telephone number, wherein the ten-digit NPA-NXX-XXXX telephone number is associated with the trunk route to the terminating central office.

24. A circuit-switching network for routing circuit-switched connections carrying data traffic to on-line data services from an originating central office to a terminating central office comprising:

a plurality of interoffice data trunks between the originating central office and the terminating central office that carry circuit-switched connections to on-line data services, wherein the interoffice data trunks are dedicated to carrying only data traffic to on-line data services;

a database in communication with the originating central office to provide information identifying circuit-switched connections carrying data traffic to on-line data services, the database further comprising:

a routing table comprising a plurality of telephone numbers associated with dial-up access to the on-line data services, a plurality of point codes identifying originating central offices, and a plurality of trunk indexes identifying trunk routes to the terminating central office; and service logic to determine the trunk route in accordance with the routing table, wherein the service logic indexes the telephone numbers associated with dial-up access to the on-line data services with the point code identifying originating central office to determine the trunk route; and a circuit-switch at the terminating central office for providing access to on-line data services from the originating central office, wherein circuit-switched connections identified by the database as data calls are routed over the interoffice data trunk dedicated to carrying only data calls via circuit-switched connections to the circuit-switch providing access to the on-line data services.

* * * * *

UNITED STATES PATENT AND TRADEMARK OFFICE
CERTIFICATE OF CORRECTION

PATENT NO. : 6,084,872
DATED : July 4, 2000
INVENTOR(S) : Robert L. Munson et al.

It is certified that error appears in the above-identified patent and that said Letters Patent is hereby corrected as shown below:

<u>Title page,</u>
Item [56], References Cited, under "U.S. PATENT DOCUMENTS", insert the following:
-- 4,654,866    3/1987    Bottle et al.
   4,756,019    7/1988    Szybicki
   4,577,066    3/1986    Bimonte et al.
   5,226,075    7/1993    Funk et al. --.
-- 5,315,641    5/1994    Montgomery et al. --.
-- 5,392,344    2/1995    Ash et al. --.

Signed and Sealed this

Second Day of July, 2002

*Attest:*

*Attesting Officer*

JAMES E. ROGAN
*Director of the United States Patent and Trademark Office*